(12) United States Patent
Young et al.

(10) Patent No.: US 8,744,035 B1
(45) Date of Patent: Jun. 3, 2014

(54) REACTOR VESSEL COOLANT DEFLECTOR SHIELD

(75) Inventors: Eric Paul Young, Corvallis, OR (US);
John T. Groome, Corvallis, OR (US);
Jose N. Reyes, Jr., Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 677 days.

(21) Appl. No.: 12/393,577

(22) Filed: Feb. 26, 2009

Related U.S. Application Data

(60) Provisional application No. 61/115,614, filed on Nov. 18, 2008.

(51) Int. Cl.
| | |
|---|---|
| *G21C 1/04* | (2006.01) |
| *G21C 15/02* | (2006.01) |
| *G21C 19/00* | (2006.01) |
| *G21C 19/07* | (2006.01) |
| *G21C 19/40* | (2006.01) |

(52) U.S. Cl.
CPC ............... *G21C 15/02* (2013.01); *G21C 19/07* (2013.01); *G21C 19/40* (2013.01); *G21Y 2004/30* (2013.01)
USPC .......................................... 376/347; 376/272

(58) Field of Classification Search
CPC ........ G21C 19/07; G21C 19/40; G21C 15/02; G21Y 2004/30
USPC .................................. 376/347, 272
See application file for complete search history.

(56) References Cited

U.S. PATENT DOCUMENTS

| | | | | |
|---|---|---|---|---|
| 2,937,127 | A | * | 5/1960 | Flora .............................. 376/301 |
| 3,599,589 | A | | 8/1971 | Busey |
| 3,865,688 | A | | 2/1975 | Kleimola |
| 4,135,552 | A | * | 1/1979 | Mendolia ........................ 138/30 |
| 5,053,190 | A | * | 10/1991 | Gardner et al. ............... 376/366 |
| 5,087,408 | A | | 2/1992 | Tominaga et al. |
| 5,276,720 | A | | 1/1994 | Oosterkamp et al. |
| 5,343,506 | A | | 8/1994 | Artnik et al. |

(Continued)

FOREIGN PATENT DOCUMENTS

| | | |
|---|---|---|
| GB | 835266 | 5/1960 |
| JP | 1119798 U | 5/1989 |
| JP | 2120693 A | 5/1990 |
| JP | 6043275 | 2/1994 |

OTHER PUBLICATIONS

Modro, S.M., et al.; Multi-Application Small Light Water Reactor Final Report; Idaho National Engineering and Environmental Laboratory; Dec. 2003; Idaho Falls, ID, U.S.A.

(Continued)

*Primary Examiner* — Frank J McGue
(74) *Attorney, Agent, or Firm* — Fish & Richardson P.C.

(57) ABSTRACT

A power module includes a reactor vessel containing a coolant and a reactor core located near a bottom end of the reactor vessel. A riser section is located above the reactor core, wherein the coolant circulates past the reactor core and up through the riser section. In one embodiment, a coolant deflector shield includes flow-optimized surfaces, wherein the flow-optimized surfaces direct the coolant towards the bottom end of the reactor vessel. In another embodiment, the reactor housing includes an inward facing portion that varies a flow pressure of the coolant and promotes a circulation of the coolant past a baffle assembly and towards the bottom end of the reactor vessel.

24 Claims, 7 Drawing Sheets

(56) References Cited

U.S. PATENT DOCUMENTS

| | | | |
|---|---|---|---|
| 6,498,827 B1 | 12/2002 | Klarner | |
| 6,795,518 B1 | 9/2004 | Conway et al. | |
| 2007/0223642 A1* | 9/2007 | Ohtsuka et al. | 376/247 |
| 2008/0279326 A1* | 11/2008 | Gilmore et al. | 376/395 |

OTHER PUBLICATIONS

IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna; Austria.

Notification Concerning Transmittal of International Preliminary Report on Patentability (1 page) and Written Opinion of the International Searching Authority (10 pages) for related international application PCT/US2009/064833, received Jun. 3, 2011.

Reyes et al., "Testing of the multi-application small light water reactor (MASLWR) passive safety systems", Nuclear Engineering and Design, Amsterdam, NL, vol. 237, No. 18, Aug. 25, 2007, pp. 1999-2005.

Communication Relating to the Results of the Partial International Search for International Application No. PCT/US2009/064833, European Patent Office, Feb. 23, 2010.

Dr. Jose N. Reyes, Jr., "NuScale Power Introduction to NuScale Design" U.S. Nuclear Regulatory Commission Pre-Application Meeting, Rockville, MD, Jul. 24, 2008 (26 pages).

Examination report for European Patent Application No. 09760392.2, dated May 2, 2012, 4 pages.

Non-Final Rejection for Korean Patent Application No. 10-2011-7013791, dated Aug. 24, 2012, 12 pages.

Non-Final Rejection for Korean Patent Application No. 10-2011-7013791, dated Mar. 27, 2013, 5 pages.

First Office Action for Chinese Patent Application No. 200980154650.9, dated Jun. 27, 2013, 12 pages.

Official Action for Canadian Patent Application No. 2,745,573, dated May 30, 2013, 3 pages.

Japan Patent Office, Notices of Reasons for Rejection for Japanese Patent Application No. 2011-536602, dated Feb. 4, 2014, 8 pages.

* cited by examiner

US 8,744,035 B1

REACTOR VESSEL COOLANT DEFLECTOR SHIELD

This application claims priority to U.S. Provisional Patent Application Ser. No. 61/115,614, filed on Nov. 18, 2008 which is incorporated by reference in its entirety.

TECHNICAL FIELD

The invention relates to the field of nuclear power generation, including systems designed to cool a reactor core.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time. A nuclear reactor 5 includes a reactor core 6 surrounded by a reactor vessel 2. Water 10 in the reactor vessel 2 surrounds the reactor core 6. The reactor core 6 is further located in a shroud 122 which surrounds the reactor core 6 about its sides. When the water 10 is heated by the reactor core 6 as a result of fission events, the water 10 is directed from the shroud 122 and out of a riser 124. This results in further water 10 being drawn into and heated by the reactor core 6 which draws yet more water 10 into the shroud 122. The water 10 that emerges from the riser 124 is cooled down and directed towards the annulus 123 and then returns to the bottom of the reactor vessel 2 through natural circulation. Pressurized steam 11 is produced in the reactor vessel 2 as the water 10 is heated.

A heat exchanger 135 circulates feedwater and steam in a secondary cooling system 130 in order to generate electricity with a turbine 132 and generator 134. The feedwater passes through the heat exchanger 135 and becomes super heated steam. The secondary cooling system 130 includes a condenser 136 and feedwater pump 138. The steam and feedwater in the secondary cooling system 130 are isolated from the water 10 in the reactor vessel 2, such that they are not allowed to mix or come into direct contact with each other.

The reactor vessel 2 is surrounded by a containment vessel 4. The containment vessel 4 is designed so that water or steam from the reactor vessel 2 is not allowed to escape into the surrounding environment. A steam valve 8 is provided to vent steam 11 from the reactor vessel 2 into an upper half 14 of the containment vessel 4. A submerged blowdown valve 18 is provided to release the water 10 into suppression pool 12 containing sub-cooled water.

Water 10 circulates through the reactor vessel 2 as a result of temperature and pressure differentials that develop as a result of heat generation through reactor operation and through heat exchange with the secondary cooling system 130. Accordingly, the efficiency of the circulation depends on the thermal properties of the reactor module 5 as well as its physical design and geometry. Conventional nuclear reactors include certain design features that tend to provide less than optimal coolant circulation, and must therefore rely on increased coolant volume or redundant components to ensure sufficient performance.

The present invention addresses these and other problems.

SUMMARY OF THE INVENTION

A power module is herein disclosed as comprising a reactor vessel containing a coolant, and a reactor core located near a bottom end of the reactor vessel. A riser section is located above the reactor core, wherein the coolant circulates past the reactor core and up through the riser section. The power module further comprises a coolant deflector shield including an ellipsoidal or other flow-optimized surface, wherein the flow-optimized surface directs the coolant towards the bottom end of the reactor vessel.

A nuclear reactor module is herein disclosed as comprising a reactor vessel including an upper end and a lower end, a pressurizer located near the upper end of the reactor vessel, and a reactor core located near the bottom end of the reactor vessel. The nuclear reactor module further comprises a baffle assembly located between the reactor core and the pressurizer, and a reactor housing the directs coolant flow through the reactor core. The reactor housing comprises an inward facing portion that varies a flow pressure of the coolant and promotes a circulation of the coolant past the baffle assembly and towards the bottom end of the reactor vessel.

A method of cooling a reactor core is herein disclosed as comprising circulating a primary coolant through a reactor housing comprising an upper riser, and directing a flow of the coolant down a reactor vessel and around the reactor housing, wherein an ellipsoidal shaped lower end of the reactor vessel promotes coolant flow through the reactor core. An ellipsoidal or flow-optimized surface shaped deflector shield located above the upper riser promotes coolant flow around the reactor housing.

The invention will become more readily apparent from the following detailed description of a preferred embodiment of the invention which proceeds with reference to the accompanying drawings.

DESCRIPTION OF EXAMPLE EMBODIMENTS

Various embodiments disclosed or referred to herein may be operated consistent, or in conjunction, with features found in co-pending U.S. application Ser. No. 11/941,024 which is herein incorporated by reference in its entirety.

Figure 2:
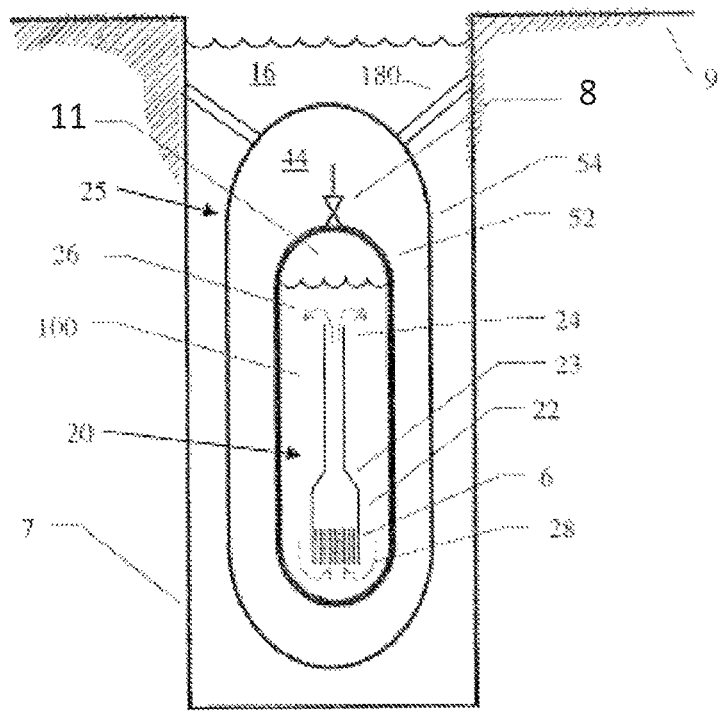
FIG. 2 illustrates a power module assembly comprising an internally dry containment vessel.

FIG. 2 illustrates a power module assembly 25 comprising an internally dry containment vessel 54. The containment vessel 54 is cylindrical in shape, and has ellipsoidal, domed, concave or hemispherical upper and lower ends. The entire power module assembly 25 may be submerged in a pool of water 16 which serves as an effective heat sink. The pool of water 16 and the containment vessel 54 may further be located below ground 9 in a reactor bay 7. The containment vessel 54 may be welded or otherwise sealed to the environment, such that liquids and gas do not escape from, or enter, the power module assembly 25. The containment vessel 54 may be supported at any external surface.

In one embodiment, the containment vessel 54 is suspended in the pool of water 16 by one or more mounting connections 180. A reactor vessel 52 is located or mounted inside the containment vessel 54. An inner surface of the reactor vessel 52 may be exposed to a wet environment including a coolant 100 or liquid, such as water, and an outer surface may be exposed to a dry environment such as air. The reactor vessel 52 may be made of stainless steel or carbon steel, may include cladding, and may be supported within the containment vessel 54.

The power module assembly 25 may be sized so that it can be transported on a rail car. For example, the containment vessel 54 may be constructed to be approximately 4.3 meters in diameter and approximately 17.7 meters in height (length). Refueling of the reactor core 6 may be performed by transporting the entire power module assembly 50 by rail car or overseas, for example, and replacing it with a new or refurbished power module assembly which has a fresh supply of fuel rods.

The containment vessel 54 encapsulates and, in some conditions, cools the reactor core 6. It is relatively small, has a high strength and may be capable of withstanding six or seven times the pressure of conventional containment designs in part due to its smaller overall dimensions. Given a break in the primary cooling system of the power module assembly 25 no fission products are released into the environment. Decay heat may be removed from the power module assembly 25 under emergency conditions.

The reactor core 6 is illustrated as being submerged or immersed in a primary coolant 100, such as water. The reactor vessel 52 houses the coolant 100 and the reactor core 6. A reactor housing 20 comprises a shroud 22 in a lower portion and a riser 24 in an upper portion of the reactor housing 20. The riser 24 may be substantially cylindrical in shape. The shroud 22 surrounds the reactor core 6 about its sides and serves to direct the coolant 100 (shown as coolant flow 26, 28) up through the center of the riser 24 located in the upper half of the reactor vessel 52, then back down the annulus 23, as a result of natural circulation of the coolant 100. In one embodiment, the reactor vessel 52 is approximately 2.7 meters in diameter and includes an overall height (length) of approximately 13.7 meters. The reactor vessel 52 may include a predominately cylindrical shape with ellipsoidal, domed, concave, or hemispherical upper and lower ends. The reactor vessel 52 is normally at operating pressure and temperature. The containment vessel 54 is internally dry and may operate at atmospheric pressure with wall temperatures at or near the temperature of the pool of water 16.

The containment vessel 54 substantially surrounds the reactor vessel 52 and may provide a dry, voided, or gaseous environment identified as containment region 44. Containment region 44 may comprise an amount of air or other fill gas such as Argonne. The containment vessel 54 includes an inner surface or inner wall which is adjacent to the containment region 44. The containment region 44 may include a gas or gases instead of or in addition to air. In one embodiment, the containment region 44 is maintained at or below atmospheric pressure, for example as a partial vacuum. Gas or gasses in the containment vessel may be removed such that the reactor vessel 52 is located in a complete or partial vacuum in the containment region 44.

Figure 1:
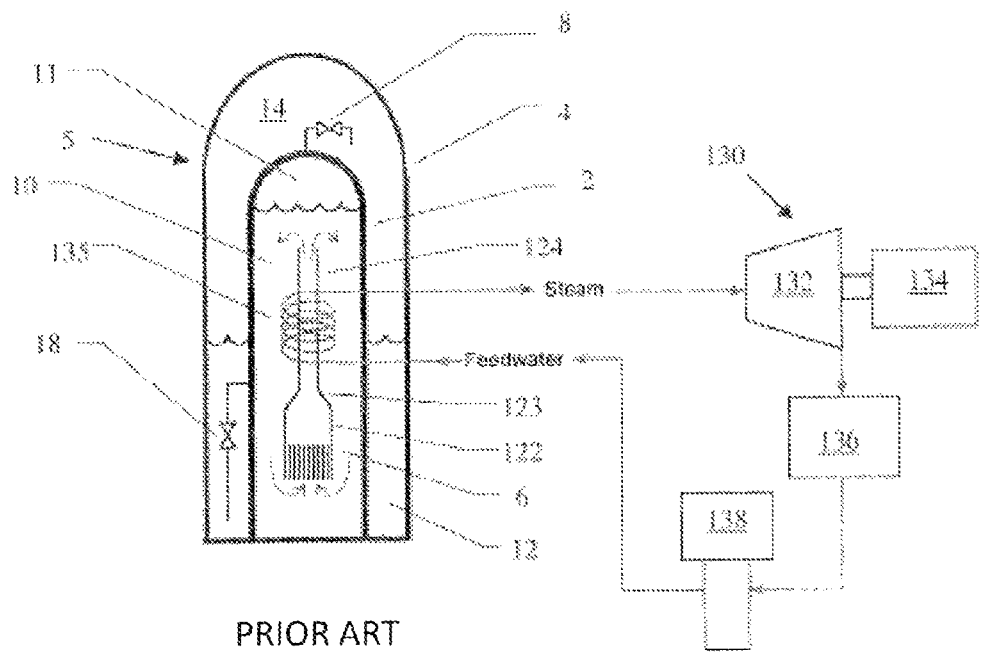
FIG. 1 illustrates a nuclear power system.

During normal operation, thermal energy from the fission events in the reactor core 6 causes the coolant 100 to heat. As the coolant 100 heats up, it becomes less dense and tends to rise up through the riser 24. As the coolant 100 temperature reduces, it becomes relatively denser than the heated coolant and is circulated around the outside of the annulus 23, down to the bottom of the reactor vessel 52 and up through the shroud 22 to once again be heated by the reactor core 6. This natural circulation causes the coolant 100 (shown as coolant flow 26, 28) to cycle through the heat exchanger 135, transferring heat to a secondary coolant, such as the secondary cooling system 130 of FIG. 1, to generate electricity.

Figure 3:
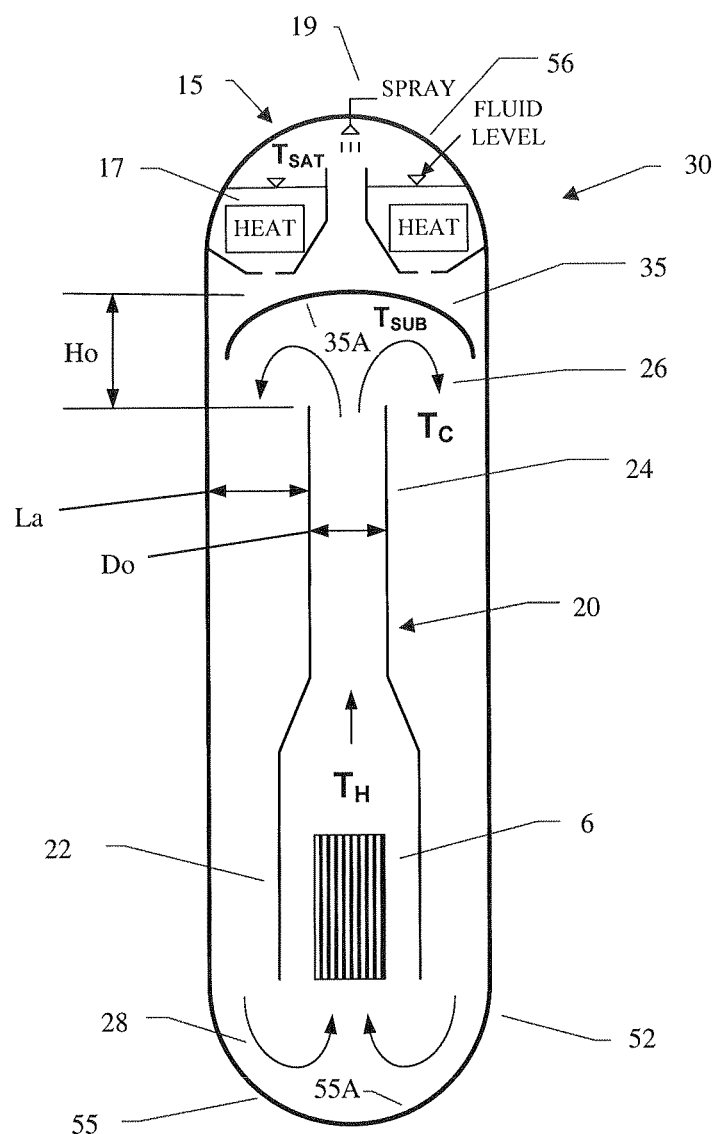
FIG. 3 illustrates a cross sectional view of an embodiment of a power module assembly comprising a reactor vessel deflector shield.

FIG. 3 illustrates a cross sectional view of an embodiment of a power module assembly 30 comprising a reactor vessel deflector shield 35. Reactor vessel 52 contains a reactor core 6 located near a bottom end 55 of the reactor vessel 52. A riser section 24 is located above the reactor core 6, wherein coolant circulates past the reactor core 6 to become high-temperature coolant $T_H$ and then continues up through the riser section 24 where it is directed back down the annulus and cooled off by a heat exchanger 135 (FIG. 1) to become low-temperature coolant $T_C$.

The reactor vessel deflector shield 35 comprises a flow-optimized ellipsoidal, domed, concave, or hemispherical shaped portion 35A, wherein the flow-optimized portion 35A directs the coolant (shown as coolant flow 26) towards the bottom end 55 of the reactor vessel 52. The ellipsoidal portion 35A may come into direct contact with and deflect the coolant that exits the riser section 24. The ellipsoidal portion 35A operates to reduce a flow resistance or turning loss of the coolant flow 26, as compared to an interaction of the coolant with a flat, or irregular surface, or plenum region without a solid interface. In one embodiment, the reduction in turning loss is by a factor of four or five compared to systems without a deflector shield. The reactor vessel deflector shield 35 may be made of stainless steel or other materials which may be formed into an ellipsoidal or optimized shaped surface.

In one embodiment, the bottom end 55 of the reactor vessel 52 comprises a second flow-optimized ellipsoidal, domed, concave, or hemispherical portion 55A, wherein the second ellipsoidal portion 55A directs the coolant (shown as coolant flow 28) towards the reactor core 6. The ellipsoidal portion 35A and second ellipsoidal portion 55A increase flow rate and promote natural circulation of the coolant through the reactor core 6.

An optimization of the coolant flow 26 may be obtained according to a ratio of the distance Ho between the top of the riser section 24 and the center of the reactor vessel deflector shield 35 and the relative distance Do between the walls of the riser section 24, wherein the dimension La represents the distance between the outside of the riser 24 and the inside surface of the reactor vessel 52. In one embodiment, the distance Do equals the diameter of the riser section 24. The flow area inside the riser is Ao, the flow area inside the annulus is Aa. The optimized coolant flow ratios may be represented as Ho/Do and Aa/Ao. In one embodiment, the optimized coolant flow ratio Ho/Do comprises a value 0.1 and 2.0, and the flow ration and Ao/Aa comprises a value between/approximately 1 and 10. Further optimization of the coolant flow 26 may be obtained by modifying the radius of curvature of the surface of ellipsoidal portion 35A to eliminate/minimize boundary layer separation and stagnation regions.

The reactor vessel deflector shield 35 is illustrated as being located between the top of the riser section 24 and a pressurizer region 15. The pressurizer region 15 is shown as comprising one or more heaters 17 and a spray nozzle 19 configured to control a pressure, or maintain a steam dome, within an upper end 56 of the reactor vessel 52. Coolant located below the reactor vessel deflector shield 35 may comprise relatively sub-cooled coolant $T_{SUB}$, whereas coolant in the pressurizer region 15 in the upper end 56 of the reactor vessel 52 may comprise substantially saturated coolant $T_{SAT}$. A fluid level of the coolant is shown as being above the reactor vessel deflector shield 35, and within the pressurizer region 15, such that the entire volume between the reactor vessel deflector shield 35 and the bottom 55 of the reactor vessel 52 is full of coolant during normal operation of the power module assembly 30.

Figure 4:
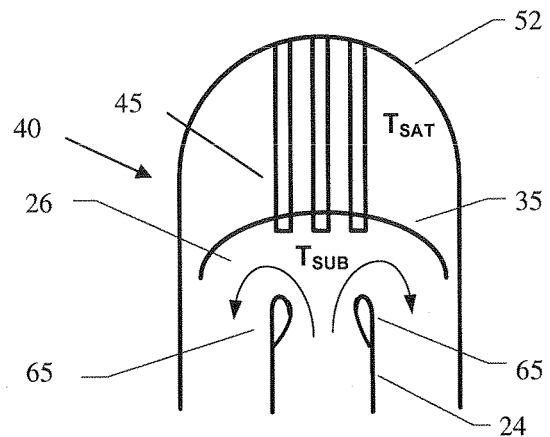
FIG. 4 illustrates a partial view of an example power module assembly comprising a reactor vessel deflector shield supported by one or more control rod guide tubes.

FIG. 4 illustrates a partial view of an example power module assembly 40 comprising a reactor vessel deflector shield 35 supported by one or more control rod guide tubes or instrumentation structures 45. The one or more control rod guide tubes or instrumentation structures 45 may be attached to an upper end of the reactor vessel 52, and serve to guide control rods that are inserted into, or removed from, the reactor core 6, or provide support for instrumentation devices located inside the reactor vessel 52. By attaching or suspending the reactor vessel deflector shield 35 from the one or more control rod guide tubes or instrumentation structures 45, the reactor vessel deflector shield 35 may be free from contacting the sides of the reactor vessel 52. By isolating the reactor vessel deflector shield 35 from the reactor vessel walls 52, the reactor vessel deflector shield 35 is protected from changes in rates of thermal expansion of the different materials and structures of the power module assembly 40, or from any movement of components that might otherwise damage the reactor vessel deflector shield 35 or the reactor vessel 52. The riser section 24 is illustrated as comprising an inward facing portion 65 that varies a flow pressure of the coolant to reduce a turning loss of the coolant 26 circulating by the reactor vessel deflector shield 35.

In one embodiment, the cross section of the inward facing portion 65 approximates a cross section of an airplane wing in shape, but with a smaller cross sectional area, for example. The cross-section blunt end of the inward facing portion 65 may face the top of the vessel or the bottom, or be blunt on both ends. The inward facing portion 65 may be continuously located around a perimeter of an upper end of the reactor housing 20 or riser section 24 (e.g. FIG. 9). The inward facing portion 65 may effect a change in pressure and accompanying loss of turning resistance of the coolant 26 about the entire perimeter of the riser section 24. In one embodiment, the inward facing portion 65 comprises multiple portions (e.g. FIG. 8) located around a perimeter of the upper end of the reactor housing 20 or riser section 24. The inward facing portion 65 may be understood to affect the coolant flow 26 or fluid pressure similar to the aerodynamics of an airplane wing, in that the flow is preferentially directed to minimize regions of separation and the related losses.

Figure 5:
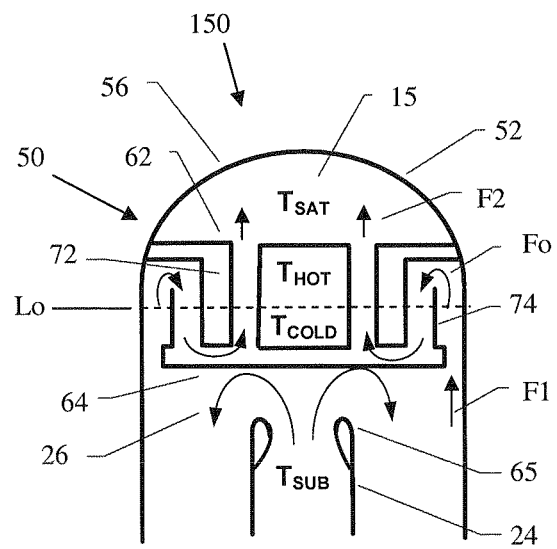
FIG. 5 illustrates a partial view of an example power module assembly comprising a baffle assembly and a coolant flow augmentation mechanism.

FIG. 5 illustrates a partial view of an example power module assembly 150 comprising a baffle assembly 50 and a coolant flow augmentation mechanism comprised of inward facing portion 65. The reactor vessel 52 includes an upper end 56 and a lower end 55 (FIG. 3). Pressurizer region 15 is located near the upper end 56 of the reactor vessel 52, whereas the reactor core 6 is located near the bottom end 55 of the reactor vessel 52. Baffle assembly 50 is shown illustrated as being located between the reactor core 6 and the pressurizer region 15. The reactor housing 20 (FIG. 3) directs coolant flow 28 through the reactor core 6, wherein the reactor housing 20 comprises inward facing portion 65 that varies a flow pressure of the coolant and promotes a circulation of the coolant (illustrated as coolant flow 26) to by-pass the baffle assembly 50 and towards the bottom end 55 of the reactor vessel 52.

The baffle assembly 50 comprises an upper baffle plate 62 and a lower baffle plate 64. A hot/cold liquid interface Lo due to stratification in the baffle region may exist between the upper and lower baffle plates 62, 64 separating the subcooled coolant $T_{SUB}$ from the saturated coolant $T_{SAT}$. The liquid interface Lo provides a medium in which the first fluid entering the pressurizer region when flow is into the pressurizer, is hot fluid, and afterwards the subcooled coolant $T_{SUB}$ entering the pressurizer heats up (or mixes together with saturated coolant $T_{SAT}$) before entering the pressurizer region 15. The baffle assembly 50 operates to impede a flow of the subcooled coolant $T_{SUB}$ from entering the pressurizer region 15, comprising substantially saturated coolant $T_{SAT}$. The baffle assembly 50 helps maintain or create a thermal trap between the upper and lower baffle plates 62, 64. A steam dome may be maintained in pressurizer region 15, or the upper end 56 of the reactor vessel 52. If the subcooled coolant $T_{SUB}$ is allowed to enter the pressurizer region 15 too quickly, it may result in a loss of reactor vessel pressure or collapse of the steam dome.

The baffle assembly 50 effectively increases a flow path length from the subcooled coolant $T_{SUB}$ on a first side of the baffle assembly 50 to the saturated coolant $T_{SAT}$ on a second side of the baffle assembly 50. Coolant flow (illustrated as F1) entering the baffle assembly 50 is allowed to flow around or by the lower baffle plate 64. The coolant flow (illustrated as Fo) next maneuvers around one or more internal baffles 72, 74 before exiting into the pressurizer region 15 as coolant flow F2, through or by the upper baffle plate 62. The flow path made by the baffles directs the flow F1 past the structure of the baffle assembly 50 that is heated from the pressurizer region 15. Directing of the flow F1 past the relatively hot structure heats this fluid, and additionally mixes the fluid with the Tsat region, effectively heating it previous to it entering the pressurizer region 15.

Figure 6:
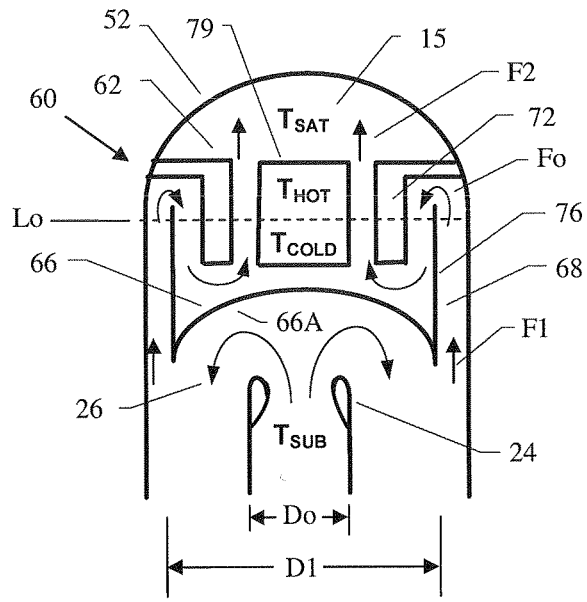
FIG. 6 illustrates an example baffle assembly comprising a reactor vessel deflector shield.

FIG. 6 illustrates an example baffle assembly 60 comprising a reactor vessel deflector shield 66. The reactor vessel deflector shield 66 comprises a flow-optimized ellipsoidal region or concave portion 66A having a diameter D1 or width that is larger than a distance Do between the inward facing portions 65 of the reactor housing 20 or riser section 24. In one embodiment, the diameter D1 of the lower baffle plate 66 is approximately equal to the width or diameter of the reactor vessel 52.

The pressurizer region 15 is located at the upper end of the reactor vessel 52. The baffle assembly 60 is located between the pressurizer region 15 and the riser section 24. The baffle assembly 60 comprises one or more baffles 72, 76 located between an upper baffle plate 62 and the reactor vessel deflector shield 66. The one or more baffles 72, 76 impede a flow of the sub-cooled coolant $T_{SUB}$ into the pressurizer region 15. The baffle assembly 60 may be understood to operate similarly as a pressurizer surge line of a typical pressurized water reactor design. The baffle assembly 60 may prevent an insurge of coolant from the reactor vessel 52 from entering the pressurizer region 15 too suddenly or at too low of a temperature. In one embodiment, the baffle assembly 60 operates to control a rate of insurge of the coolant into the pressurizer region 15, and increases the temperature of the insurge flow by structure heat addition and mixing with hot fluids.

The baffle assembly 60 includes an upper portion which comprises the upper baffle plate 62. The upper baffle plate 62 may include, or be attached to, one or more baffles 72. The baffle assembly 60 further includes a lower portion which comprises the reactor vessel deflector shield 66. The reactor vessel deflector shield 66 may include, or be attached to, one or more baffles 76.

The baffle assembly 60 may comprise one or more heaters 79. The one or more heaters 79 may be provided intermediate the upper and lower baffle plates 62, 66. In one embodiment, the one or more heaters 79 are provided within the upper baffle plate 62 to warm the coolant. In another embodiment the one or more heaters 79 are provided in the liquid interface Lo. Coolant that passes through the baffle assembly 70 may become heated to at, or near, saturation temperatures $T_{SAT}$ while being transferred into the pressurizer region 15. The baffle assembly 60 may be understood to both isolate the pressurizer region 15 from the subcooled coolant $T_{SUB}$, as well as promote increased flow rate of the coolant (illustrated as flow 26) in the reactor vessel 52.

In one embodiment, a width or diameter of the reactor vessel deflector shield 66 is less than a width or diameter of the reactor vessel 52 forming a pathway or channel 68 about the perimeter of the reactor vessel deflector shield 66. The channel 68 provides a path for the coolant flow (illustrated as F1) to pass by or through the reactor vessel deflector shield 66. Coolant continues to flow (illustrated as Fo) around the one or more baffles 72, 76 before exiting by or through the upper baffle plate 62 as coolant flow F2. Coolant that passes through the baffle assembly 60 may become heated to at, or near, saturation temperatures $T_{SAT}$ while being transferred through the pathway or channel 68 and being heated by the upper baffles 72.

Figure 7:
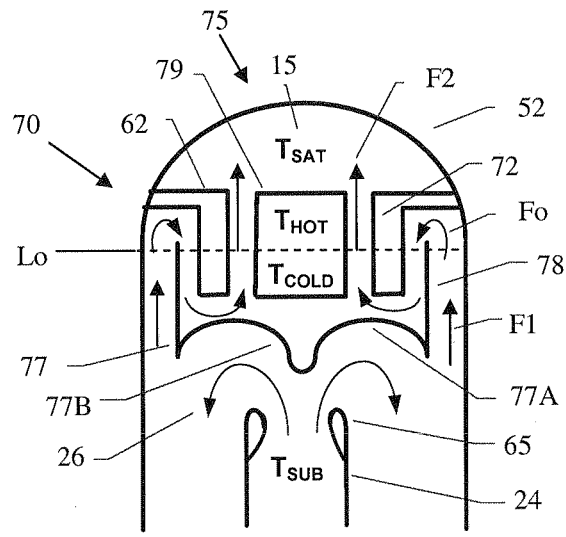
FIG. 7 illustrates a partial view of an example power module assembly comprising a reactor vessel deflector shield and coolant flow augmentation mechanism.

FIG. 7 illustrates a partial view of an example power module assembly 75 comprising a baffle assembly 70 and coolant flow augmentation mechanism comprised of inward facing portion 65. The baffle assembly 70 comprises an upper baffle plate 62 and a lower baffle plate 77 including one or more flow-optimized ellipsoidal, domed, hemispherical or concave surfaces 77A and a divider 77B. The flow-optimized concave surface 77A of the lower baffle plate 77 directs the coolant 26 down around the riser section 24 of the housing 20 to the bottom of the reactor vessel 52. The flow-optimized concave surface 77A of the lower baffle plate 77 may be understood to operate the same or similar to the flow-optimized ellipsoidal region or concave portion 66A of the reactor vessel deflector shield 66 of FIG. 6.

Divider 77B further facilitates coolant 26 to flow in an outward direction from the center of the baffle plate 77. Divider 77B may be shaped similar to a bullet tip. Baffle plate 77 minimizes pressure loss of coolant flow based on an optimized position and geometry above the exit of the riser section 24.

The baffle assembly 70 is located between the pressurizer region 15 and the riser section 24. The baffle assembly 70 comprises one or more baffles 72, 78 located between the upper baffle plate 62 and the lower baffle plate 77. The one or more baffles 72, 78 impede a flow of the sub-cooled coolant $T_{SUB}$ into the pressurizer region 15.

An upper portion of the baffle assembly 70 comprises the upper baffle plate 62. The upper baffle plate 62 may include, or be attached to, one or more baffles 72. A lower portion of the baffle assembly 70 comprises the lower baffle plate 77. The lower baffle plate 77 may include, or be attached to, one or more baffles 78. A pathway or channel may be formed through one or all of the baffles 72, 78. The channel provides a path for the coolant flow (illustrated as F1) to pass by or through the lower baffle plate 77. Coolant continues to flow (illustrated as Fo) through the one or more baffles 72, 78 before exiting by or through the upper baffle plate 62 as coolant flow F2.

The baffle assembly 70 may comprise one or more heaters 79. The one or more heaters 79 may be provided intermediate the upper and lower baffle plates 62, 77. In one embodiment, the one or more heaters 79 are provided within the upper baffle plate 62 to warm the coolant entering the pressurizer region during an insurge. In another embodiment the one or more heaters 79 are provided in the temperature variation layer proximate to the liquid interface Lo. Coolant that passes through the baffle assembly 70 may become heated to at, or near, saturation temperatures $T_{SAT}$ while being transferred into the pressurizer region 15. The baffle assembly 70 may be understood to both isolate the pressurizer region 15 from the subcooled coolant $T_{SUB}$, as well promote increased flow rate of the coolant (illustrated as flow 26) in the reactor vessel 52.

In one embodiment, the inward facing portion 65 has a cross section which approximates an inverted teardrop. The inward facing portion 65 has a cross section which generally increases in thickness towards an upper end of the riser region 24. The upper end of the reactor housing 20, or riser section 24, comprises a perimeter characterized by a rounded rim of the inverted teardrop.

Figure 8:
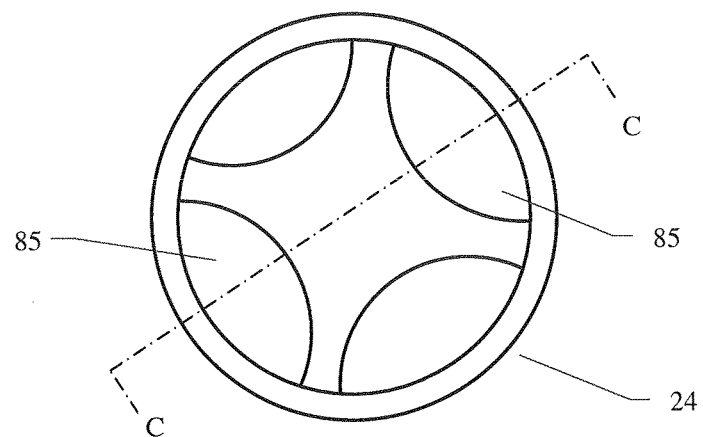
FIG. 8 illustrates a plan view of an embodiment of the coolant flow augmentation mechanism comprising a plurality of inward facing portions.

FIG. 8 illustrates a plan view of an embodiment of the coolant flow augmentation mechanism 65 comprising a plurality of inward facing portions 85. The coolant flow augmentation mechanism 65 is illustrated as comprising four inward facing portions 85 located about the perimeter of the top of the riser 24, however it is understood that different numbers and types of inward facing portions 85 may be provided for. Partial views of the riser 24 and inward facing portion 85 illustrated in FIGS. 4, 5, and 7 may be understood as comprising a cross sectional view C-C of the coolant flow augmentation mechanism 65.

Figure 9:
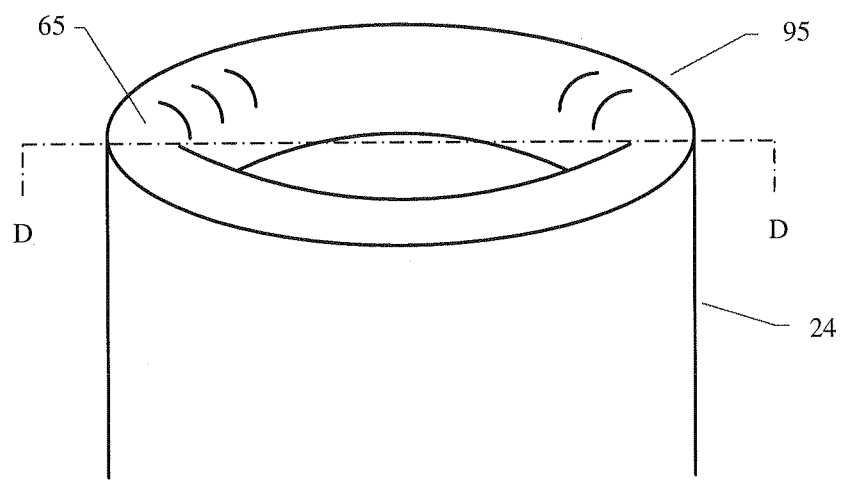
FIG. 9 illustrates an elevated side view of an embodiment of the coolant flow augmentation mechanism comprising a continuous inward facing portion.

FIG. 9 illustrates an elevated side view of an embodiment of the coolant flow augmentation mechanism 65 comprising a continuous inward facing portion 95. The inward facing portions 95 is illustrated as being located about the perimeter of the top of the riser 24. Partial views of the riser 24 and inward facing portion 95 illustrated in FIGS. 4, 5, and 7 may be understood as comprising a cross sectional view D-D of the coolant flow augmentation mechanism 65.

Figure 10:
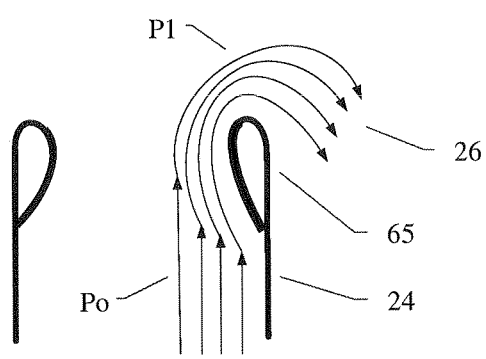
FIG. 10 illustrates coolant flow around a coolant flow augmentation mechanism.

FIG. 10 illustrates coolant flow 26 around a coolant flow augmentation mechanism 65. A fluid pressure Po of the coolant flow 26 exiting the riser 24 is varied as fluid pressure P1 when it passes around the coolant flow augmentation mechanism 65. Coolant flow augmentation mechanism 65 increases an effective path of the coolant flow 26, which results in the varied fluid pressure P1, as the velocity of the coolant flow 26 varies. Varying the fluid pressure of the coolant operates to reduce a flow resistance or turning loss of the coolant flow 26 by preventing or minimizing boundary layer separation of the flow 26 from the riser 24. This is accomplished by providing a smooth transition for the flow exiting the riser section 24 and entering into the annulus flowing back towards the bottom of the reactor vessel 52.

Figure 11:
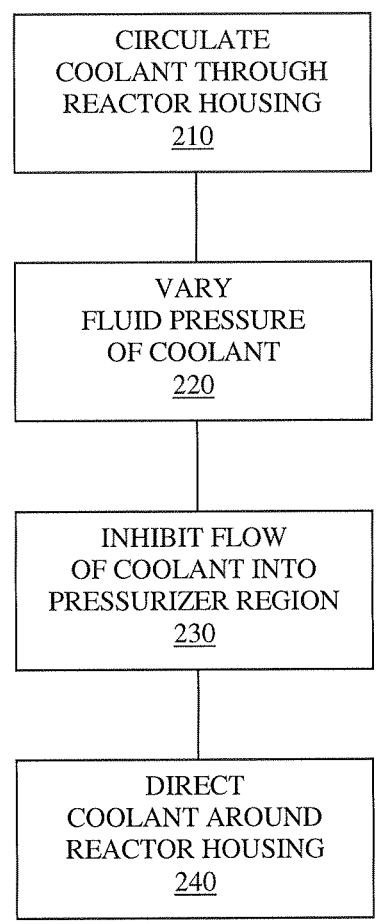
FIG. 11 illustrates a novel method of cooling a reactor core using a reactor vessel deflector shield.

FIG. 11 illustrates a novel method of cooling a reactor core using a reactor vessel deflector shield. The method may be understood to operate with, but not limited by, various embodiments illustrated herein as FIGS. 1-10.

At operation 210, a primary coolant is circulated through a reactor housing comprising an upper riser.

At operation 220, a fluid pressure of the coolant in the reactor housing is varied by directing a coolant flow around an inward facing portion of the upper riser.

At operation 230, a flow-optimized ellipsoidal, domed, concave or hemispherical shaped deflector shield forms a lower portion of a baffle system that inhibits the flow of coolant into a pressurizer region. In one embodiment, the flow-optimized ellipsoidal deflector shield is located between the upper riser and the pressurizer region, wherein the pressurizer region is located in an upper end of reactor vessel.

At operation 240, a flow of the coolant is directed down the reactor vessel and around the reactor housing. A flow-optimized ellipsoidal, domed, concave or hemispherical shaped lower end of the reactor vessel promotes coolant flow through the reactor core, and the flow-optimized ellipsoidal deflector shield located above the upper riser promotes coolant flow around the reactor housing.

Although the embodiments provided herein have primarily described a pressurized water reactor, it should be apparent to one skilled in the art that the embodiments may be applied to other types of nuclear power systems as described or with some obvious modification. For example, the embodiments or variations thereof may also be made operable with a boiling water reactor.

The rate of fluid flow about the reactor housing, the rate of insurge and outsurge flows within the baffle assemblies, and the variation in pressure of the fluid moving about to flow augmentation devices, as well as other rates and values described herein are provided by way of example only. Other rates and values may be determined through experimentation such as by construction of full scale or scaled models of a nuclear reactor fluid system.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A power module comprising:
a reactor vessel containing a coolant;
a reactor core disposed in the reactor vessel and submerged in the coolant;
a riser section disposed in the reactor vessel above the reactor core, the riser section comprising one or more outer walls defining an inner passageway;
a coolant deflector shield comprising an ellipsoidal surface, the coolant deflector shield being disposed in the reactor vessel at a position above an open end of the inner passageway;
a pressure control assembly, positioned in the reactor vessel in a pressurizer region between the coolant deflector shield and an upper end of the reactor vessel, to control a pressure in the pressurizer region, the pressure control assembly comprising one or more heaters positioned on opposite sides of the reactor vessel within the pressurizer region; and
a fluid passageway that extends between the heaters from the coolant deflector shield to the upper end of the reactor vessel and is fluidly coupled to gaps between an inner surface of the reactor vessel and distal ends of the ellipsoidal surface for a flow of coolant from the riser section into the pressurizer region and through the fluid passageway.

2. The power module according to claim 1, wherein a bottom end of the reactor vessel comprises a second ellipsoidal surface, and wherein the second ellipsoidal surface directs the coolant towards the reactor core.

3. The power module according to claim 1, wherein the ellipsoidal surface comprises a surface that deflects the coolant that exits the riser section.

4. The power module according to claim 1, wherein the coolant deflector shield is supported by one or more control rod guide tubes or instrumentation structures.

5. The power module according to claim 4, wherein the one or more control rod guide tubes are attached to the upper end of the reactor vessel.

6. The power module according to claim 5, wherein the coolant deflector shield is suspended from the one or more control rod guide tubes such that the coolant deflector shield is substantially free from contact with the reactor vessel.

7. The power module according to claim 6, wherein the suspended coolant deflector shield is substantially free from changes in rates of thermal expansion of one or more components of the power module.

8. The power module according to claim 1, wherein the power module is configured to be submerged in a pool of liquid disposed in a reactor bay, the reactor bay disposed below a terranean surface.

9. The power module according to claim 1, wherein the ellipsoidal surface is configured to reduce a turning loss of the coolant directed towards a bottom end of the reactor vessel.

10. The power module according to claim 9, wherein the reduction in turning loss is between a factor of about 4 and about 5.

11. The power module according to claim 1, wherein the coolant deflector shield is disposed in the reactor vessel at a position below a fluid level of the coolant.

12. The power module according to claim 1, wherein the riser section comprises an inward facing portion at a top end of the riser section, a vertical cross-section of the inward facing portion comprising a substantially oval cross section that extends around a perimeter of the top end of the riser section.

13. The power module according to claim 12, wherein the coolant deflector shield is arranged at a vertical distance above the top end of the riser section that is substantially greater than a vertical distance between two distal ends of the ellipsoidal surface and the top end of the riser section, wherein a minor axis of the ellipsoidal surface comprises a distance between the top end of the riser section and a midpoint location between the two distal ends.

14. The power module according to claim 12, wherein the substantially oval cross section approximates an inverted teardrop.

15. The power module according to claim 14, wherein the perimeter of the top end of the riser section comprises a rounded rim of the inverted teardrop.

16. The power module according to claim 1, wherein the ellipsoidal surface comprises a single ellipsoidal surface that comprises a single midpoint location between two distal ends of the single ellipsoidal surface.

17. The power module according to claim 16, wherein the coolant deflector shield is disposed at the position such that the midpoint location of the ellipsoidal surface is substantially aligned with a centerline of the riser section.

18. The power module according to claim 16, wherein a distance between the midpoint location and a top end of the riser section comprises a first distance, and a diameter of the riser section comprises a second distance, and a ratio of the first distance to the second distance is between about 0.1 and about 2.0.

19. The power module according to claim 18, further comprising a first area defined by the diameter of the riser section, and a second area defined by an annulus between the riser section and the inner surface of the reactor vessel, and a ratio of the second area to the first area is between about 1 and about 10.

20. The power module according to claim 1, wherein the pressure control assembly further comprises a spray nozzle.

21. The power module according to claim 20, wherein the fluid passageway extends between the coolant deflector shield and the spray nozzle positioned at the upper end of the reactor vessel.

22. The power module according to claim 20, wherein the one or more heaters comprise a pair of heaters that are configured to heat the coolant that enters into the pressurizer region, such that the pressure control assembly controls the pressure in the pressurizer region to increase a flow rate of the coolant in the reactor vessel.

23. The power module according to claim 22, wherein the coolant in the pressurizer region comprises substantially saturated coolant with a higher temperature than the coolant below the coolant deflector shield that comprises relatively sub-cooled coolant.

24. The power module according to claim 20, wherein the pressure control assembly is configured to control the coolant to have a fluid level above the coolant deflector shield and the one or more heaters, such that an entire volume between the coolant deflector shield and a bottom end of the reactor vessel is full of the coolant.

* * * * *